US009299993B2

(12) United States Patent
Ikoma

(10) Patent No.: US 9,299,993 B2
(45) Date of Patent: Mar. 29, 2016

(54) FUEL CELL AND SEPARATOR

(71) Applicant: BROTHER KOGYO KABUSHIKI KAISHA, Nagoya-shi (JP)

(72) Inventor: Atsuki Ikoma, Okazaki (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 33 days.

(21) Appl. No.: 14/228,857

(22) Filed: Mar. 28, 2014

(65) Prior Publication Data
US 2015/0093669 A1    Apr. 2, 2015

(30) Foreign Application Priority Data

Sep. 30, 2013  (JP) ................. 2013-205087
Mar. 18, 2014  (JP) ................. 2014-054596

(51) Int. Cl.
*H01M 8/02* (2006.01)
*H01M 8/10* (2006.01)
(52) U.S. Cl.
CPC ............ *H01M 8/0267* (2013.01); *H01M 8/026* (2013.01); *H01M 2008/1095* (2013.01)
(58) Field of Classification Search
CPC .............. H01M 8/0267; H01M 8/026; H01M 2008/1095
See application file for complete search history.

(56) References Cited

U.S. PATENT DOCUMENTS

2001/0041281 A1*  11/2001  Wilkinson et al. ............ 429/34
2006/0099479 A1*  5/2006   Friedman et al. ............. 429/35
2009/0214929 A1*  8/2009   Gao .............................. 429/34
2010/0239957 A1*  9/2010   Yamamoto et al. .......... 429/514
2011/0207018 A1   8/2011   Nakagawa et al.

FOREIGN PATENT DOCUMENTS

| EP | 1246282 A1 | 10/2002 |
| JP | 3342079 B2 | 11/2002 |
| JP | 2005-268049 A | 9/2005 |
| JP | 4733237 B2 | 7/2011 |
| JP | 2011-171222 A | 9/2011 |
| JP | 2011-228187 A | 11/2011 |
| WO | 02/15312 A1 | 2/2002 |

OTHER PUBLICATIONS

International Search Report and Written Opinion of the International Searching Authority issued in PCT/JP2014/001893, mailed Jun. 24, 2014.

* cited by examiner

*Primary Examiner* — Muhammad Siddiquee
(74) *Attorney, Agent, or Firm* — Fox Rothschild LLP

(57) ABSTRACT

A separator having planar shape may comprise a second inner wall and a third inner wall formed inside of the separator and disposed between a first hole and a plurality of first inner walls. The second inner wall and the third inner walls may comprise a plurality of first grooves formed inside of the separator and a plurality of first concaves facing the plurality of first grooves inside of the separator. Each of the plurality of first grooves extends between the first hole and the plurality of first inner walls along a first direction. Each of the plurality of first concaves curves outward from inside of the separator and extends between one of the plurality of first grooves and other of the plurality of first grooves.

6 Claims, 10 Drawing Sheets

FUEL CELL AND SEPARATOR

CROSS-REFERENCE TO RELATED APPLICATIONS

This nonprovisional application claims priority under 35 U.S.C. §119(a) on Patent Application No. 2013-205087 filed in Japan on Sep. 30, 2013, and Patent Application No. 2014-054596 filed in Japan on Mar. 18, 2014 the entire contents of which are hereby incorporated by reference.

FIELD

The present disclosure relates to a fuel cell and a separator.

BACKGROUND

A solid polymer type fuel cell using a solid polymeric electrolyte membrane having hydrogen ion permeability is known as one of fuel cells. A fuel cell of the solid polymer type fuel cell includes a pair of electrodes (an anode electrode and a cathode electrode) that sandwich the solid polymeric electrolyte membrane, and separators are disposed outside the electrodes. The fuel cell system is configured to serially connect a plurality of fuel cells.

A conventional disclosure discloses that an oxidizing gas flow path, a fuel gas flow path, and a cooling medium flow path are generated along a same first direction. More specifically, a hole for supplying oxidizing gas, a hole for supplying fuel gas, and a hole for supplying cooling medium are generated along one outer edge of the separator. A hole for discharging oxidizing gas, a hole for discharging fuel gas, and a hole for discharging cooling medium are generated along other outer edge of the separator. The cooling medium flow path is generated inside of the separator from the hole for supplying the cooling medium to the hole for discharging the cooling medium along the first direction.

SUMMARY

For example, it is considered that the hole for supplying the oxidizing gas is generated in one edge of the separator along the long side of the separator and the hole for discharging the oxidizing gas is generated in other edge of the separator along the long side of the separator. Furthermore, the hole for supplying the fuel gas is generated in one edge of the separator along the short side of the separator and the hole for discharging fuel gas is generated in other edge of the separator along the short side of the separator. In this case, the hole for supplying the cooling medium is generated in one edge of the separator along the short side of the separator and the hole for discharging the cooling medium is generated in other edge of the separator along the short side of the separator. The conventional method (for example, see Patent Literature 1) does not disclose that a cooling medium path flow which enables the cooling medium to flow to whole inside of the separator uniformly. The conventional method does not enable the cooling medium to flow to whole inside of the separator uniformly.

This disclosure provides for a separator enabling the cooling medium to flow to whole inside of the separator, even though the cooling medium flow path and the oxidizing gas flow path are generated as described above.

A first aspect in accordance with the present disclosure may provide a fuel cell comprising:

a membrane electrode assembly having planar shape; and a separator having planar shape and disposed on a surface of the membrane electrode assembly;

wherein the separator comprises:

a plurality of first inner walls formed inside of the separator extending between a first hole and a second hole along a first direction, wherein the first hole is formed in one outer edge of the separator along the first direction, wherein the second hole is formed in other outer edge of the separator along the first direction;

a second inner wall formed inside of the separator and disposed between the first hole and the plurality of first inner walls, the second inner wall connected to the plurality of first inner walls inside of the separator and a third hole, wherein the third hole is formed in one outer edge of the separator along a second direction perpendicular to the first direction;

wherein the second inner wall comprises:

a plurality of first grooves formed inside of the separator, each of the plurality of first grooves extending between the first hole and the plurality of first inner walls along the first direction; and a plurality of first concaves facing the plurality of first grooves inside of the separator, each of the plurality of first concaves curving outward from inside of the separator and extending along the second direction between one of the plurality of first grooves and other of the plurality of first grooves;

a third inner wall formed inside of the separator and disposed between the second hole and the plurality of first inner walls, the second inner wall connected to the plurality of first inner walls and a fourth hole, wherein the fourth hole is formed in other outer edge of the separator along the second direction;

wherein the third inner wall comprises:

a plurality of second grooves formed inside of the separator, each of the plurality of second grooves extending between the second hole and the plurality of first inner walls along the first direction; and a plurality of second concaves facing the plurality of second grooves inside of the separator, each of the plurality of second concaves curving outward from inside of the separator and extending along the second direction between one of the plurality of second grooves and other of the plurality of second grooves.

A second aspect in accordance with the present disclosure may provide a separator having planar shape comprising:

a plurality of first inner walls formed inside of the separator extending between a first hole and a second hole along a first direction, wherein the first hole is formed in one outer edge of the separator along the first direction, wherein the second hole is formed in other outer edge of the separator along the first direction;

a second inner wall formed inside of the separator and disposed between the first hole and the plurality of first inner walls, the second inner wall connected to the plurality of first inner walls inside of the separator and a third hole, wherein the third hole is formed in one outer edge of the separator along a second direction perpendicular to the first direction;

wherein the second inner wall comprises:

a plurality of first grooves formed inside of the separator, each of the plurality of first grooves extending between the first hole and the plurality of first inner walls along the first direction; and a plurality of first concaves facing the plurality of first grooves inside of the separator, each of the plurality of first concaves curving outward from inside of the separator and extending between one of the plurality of first grooves and other of the plurality of first grooves;

a third inner wall formed inside of the separator and disposed between the second hole and the plurality of first inner walls, the second inner wall connected to the plurality of first inner walls and a fourth hole, wherein the forth hole is formed in other outer edge of the separator along the second direction;

wherein the third inner wall comprises:

a plurality of second grooves formed inside of the separator, each of the plurality of second grooves extending between the second hole and the plurality of first inner walls along the first direction; and a plurality of second concaves facing the plurality of second grooves inside of the separator, each of the plurality of second concaves curving outward from inside of the separator and extending between one of the plurality of second grooves and other of the plurality of second grooves.

The above and further objects and features will more fully be apparent from the following detailed description with accompanying drawings.

DETAILED DESCRIPTION OF NON-LIMITING EXAMPLE EMBODIMENTS (Description of Embodiment of Fuel Cell)

Figure 1:
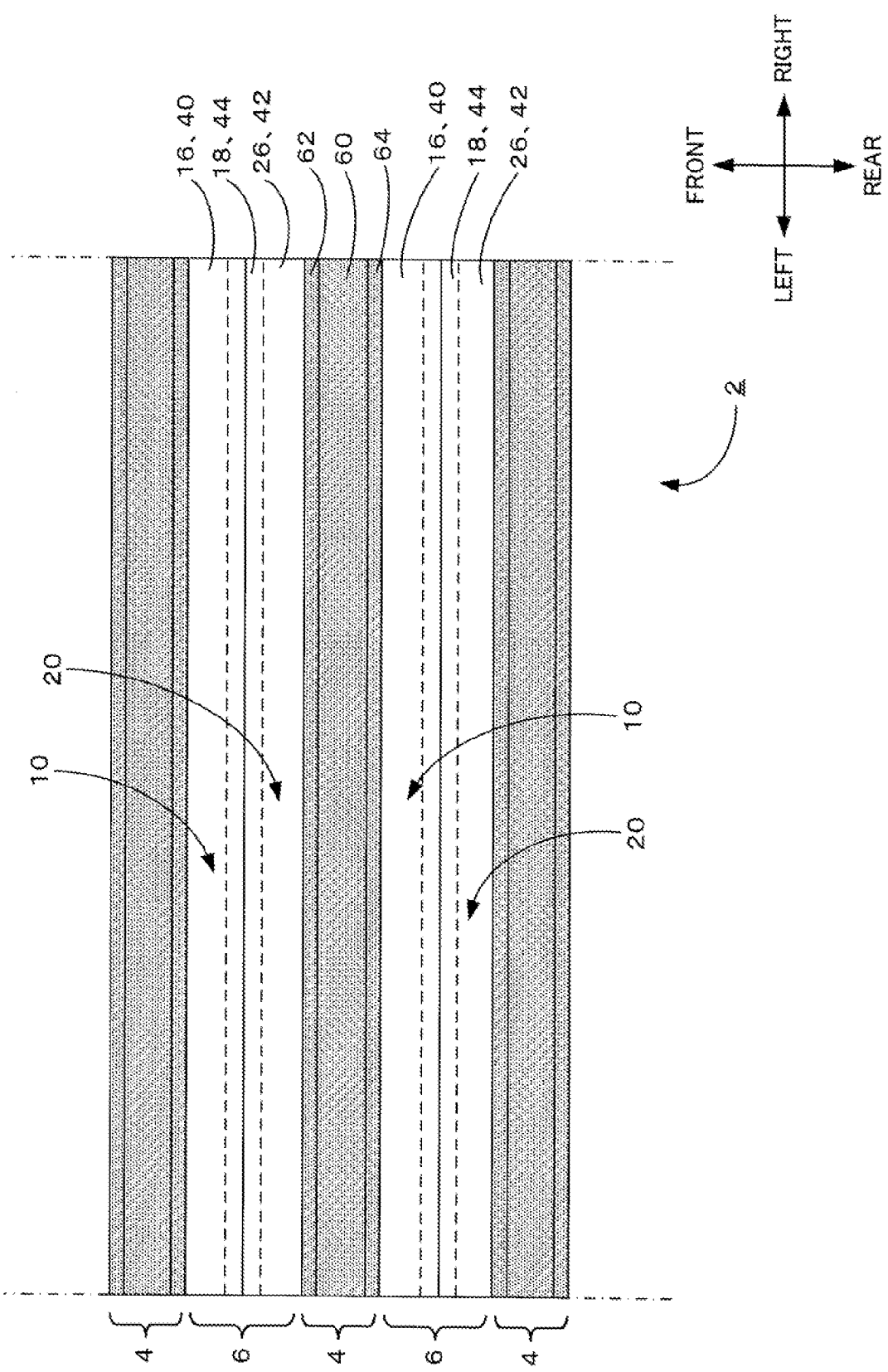
FIG. 1 is an example of a schematic view showing an embodiment of a fuel cell.
Figure 3A:
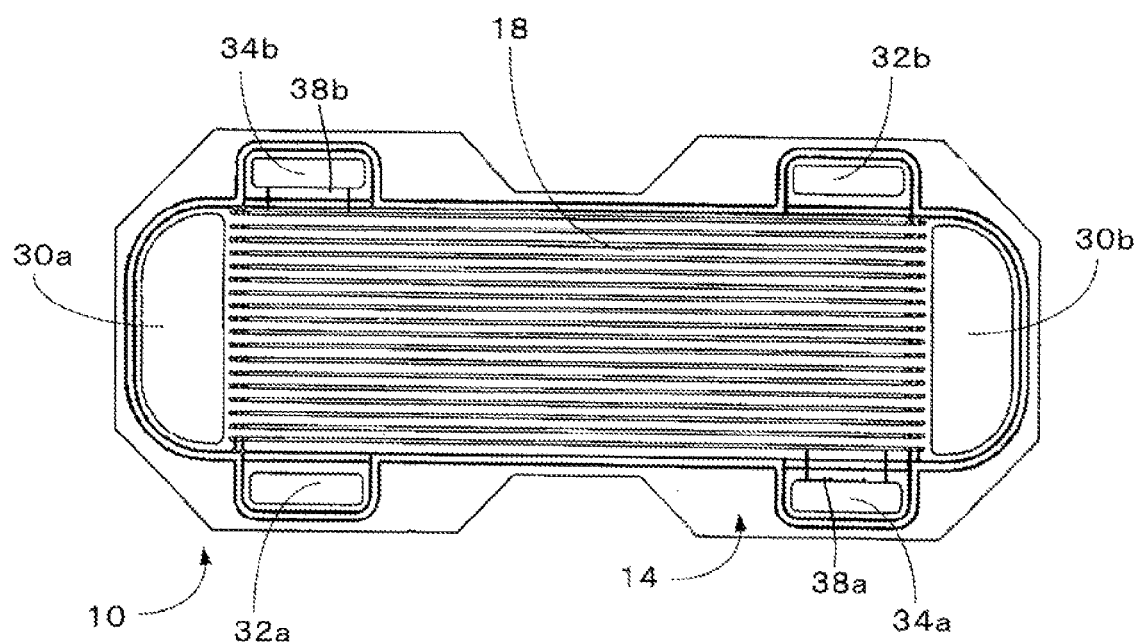
FIG. 3A shows an example of a side view showing a shape of a lamination surface 14 of a first plate 10.
Figure 3A:
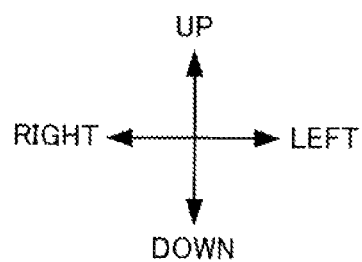
Figure 3B:
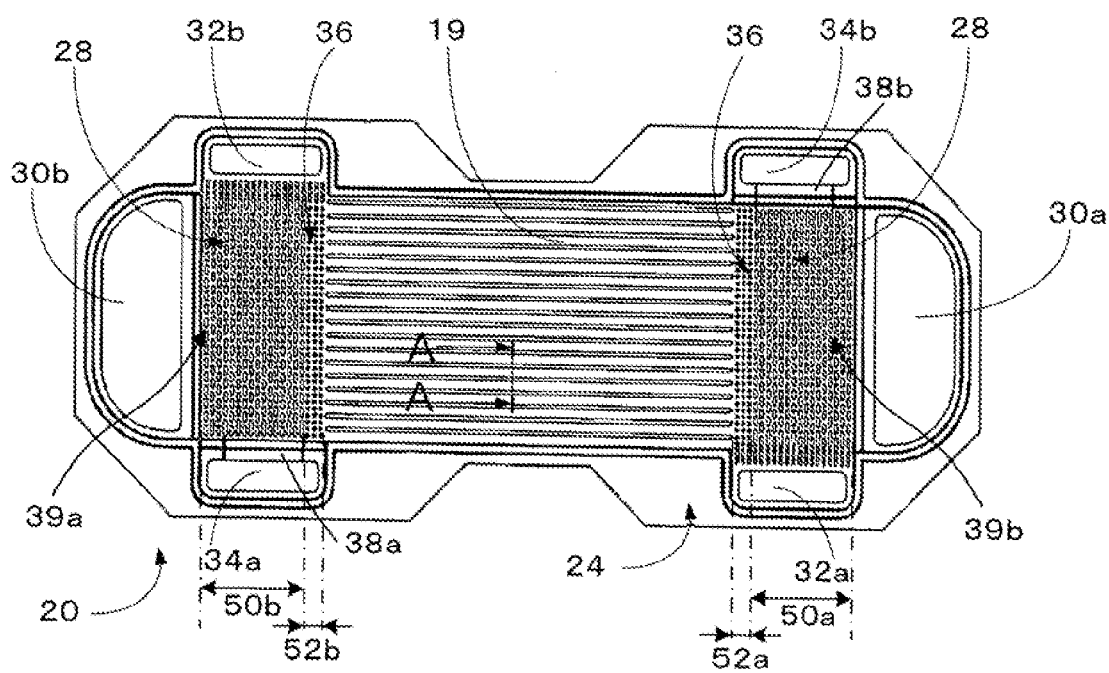
FIG. 3B shows an example of a side view showing a shape of a lamination surface 24 of a second plate 20.
Figure 3B:
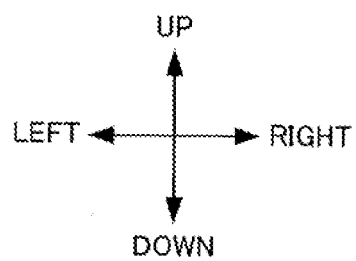

An embodiment of a fuel cell 2 including a separator will be schematically described with reference to FIG. 1. The fuel cell 2 comprises a plurality of membrane electrode assemblies (hereinafter referred to as "MEAs") 4 stacked via separators 6. Each of the plurality of MEAs 4 comprises a polymeric membrane 60 having hydrogen ion permeability, an anode electrode 62, and the cathode electrode 64. The polymeric membrane 60 is sandwiched between the anode electrode 62 and the cathode electrode 64. Further, the fuel cell 2 comprises the MEA 4 and the separators 6 disposed at both sides of the MEA 4. FIG. 1 shows a portion of the fuel cell 2 in which the MEAs 4 are partitioned by the separators 6. The separator 6 comprises a first plate 10 and a second plate 20 which are laminated. A first gas flow path 40 is formed by a first gas flow path walls 16 between the first plate 10 and the cathode 64 electrode. The first gas flow path walls 16 are extending in the left-right direction. A second gas flow path 42 is formed by a second gas flow path walls 26 between the second plate 20 and the anode electrode 62. The second gas flow path walls 26 are extending in the left-right direction. In addition, as shown in FIGS. 3A and 3B, a cooling medium flow path 44 is formed by first cooling medium flow path walls 18 and second cooling medium flow path walls 19 are formed between the first plate 10 and the second plate 20. The first cooling medium flow path walls 18 are extending in the left-right direction.

Next, an embodiment of the separator 6 will be described with reference to FIGS. 2 to 6. An arbitrary material such as stainless steel or an aluminum alloy may be used as a material of the separator 6.

(Description of Embodiment of Separator)

The embodiment of the separator 6 will be described with reference to FIG. 2. The separator 6 comprises the first plates 10 and the second plate 20 which are laminated. That is, FIGS. 2(a) and 2(b) show front and rear surfaces of the separator 6.

In the drawings, a lateral left-right direction is referred to as a first direction, and a direction perpendicular to the first direction is referred to as a second direction. In other words, the second direction may be referred as the up-down direction. As shown in FIG. 2, when the first plate 10 and the second plate 20 have substantially rectangular shapes, the first direction is a lengthwise direction and the second direction is a widthwise direction. However, the first plate 10 and the second plate 20 are not limited to the rectangular shapes but may have, for example, substantially square shapes. Further, since FIGS. 2(a) and 2(b) show the front surface and the rear surface of the separator 6, a flow direction of a gas from a right side to a left side of FIG. 2A is a flow direction of the gas from a left side to a right side of FIG. 2B.

<Description of First Gas Flow Path>

Figure 2A:
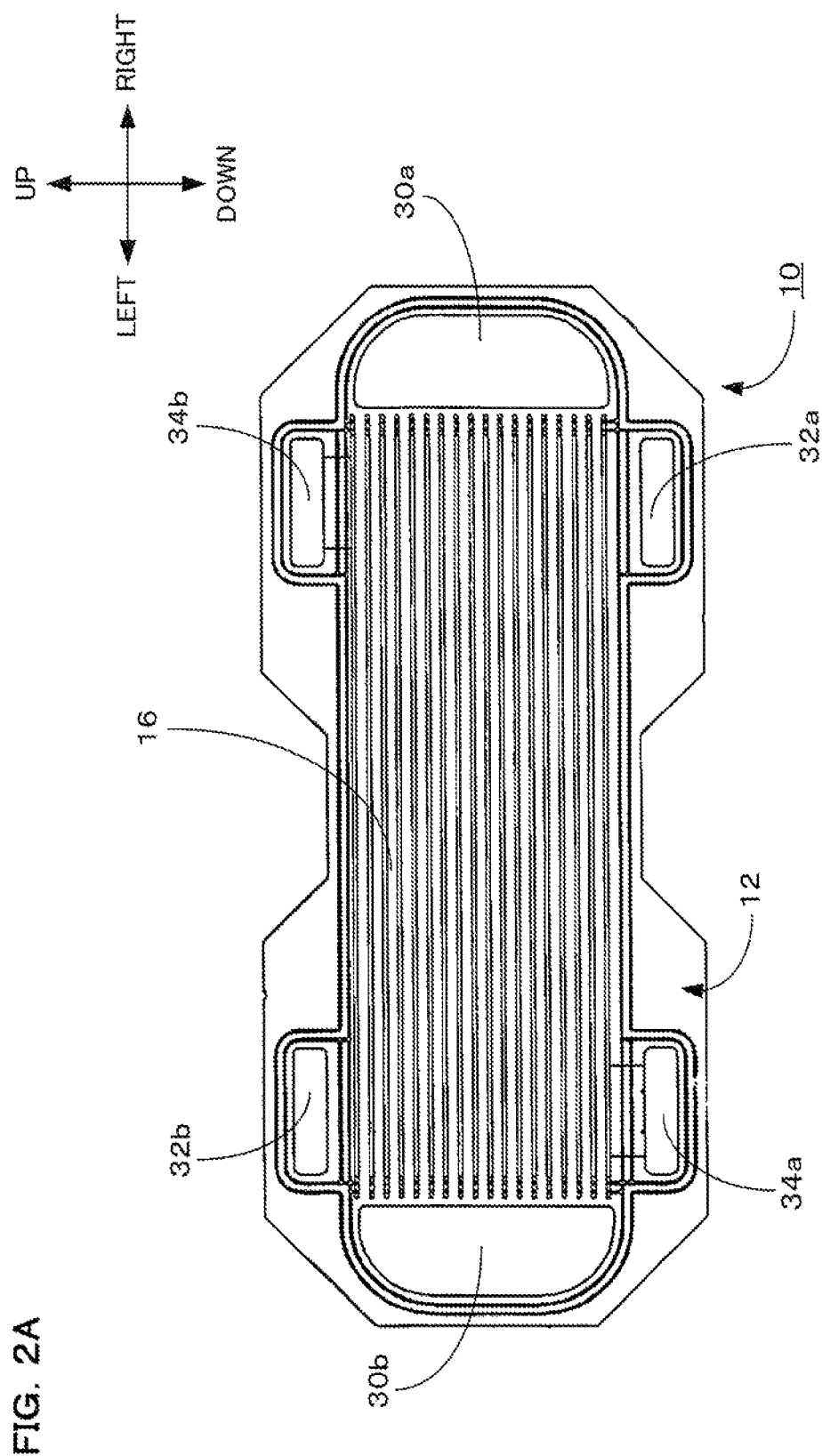
FIG. 2A shows an example of a side view showing a shape of a surface 12 of a first plate 10.
Figure 5:
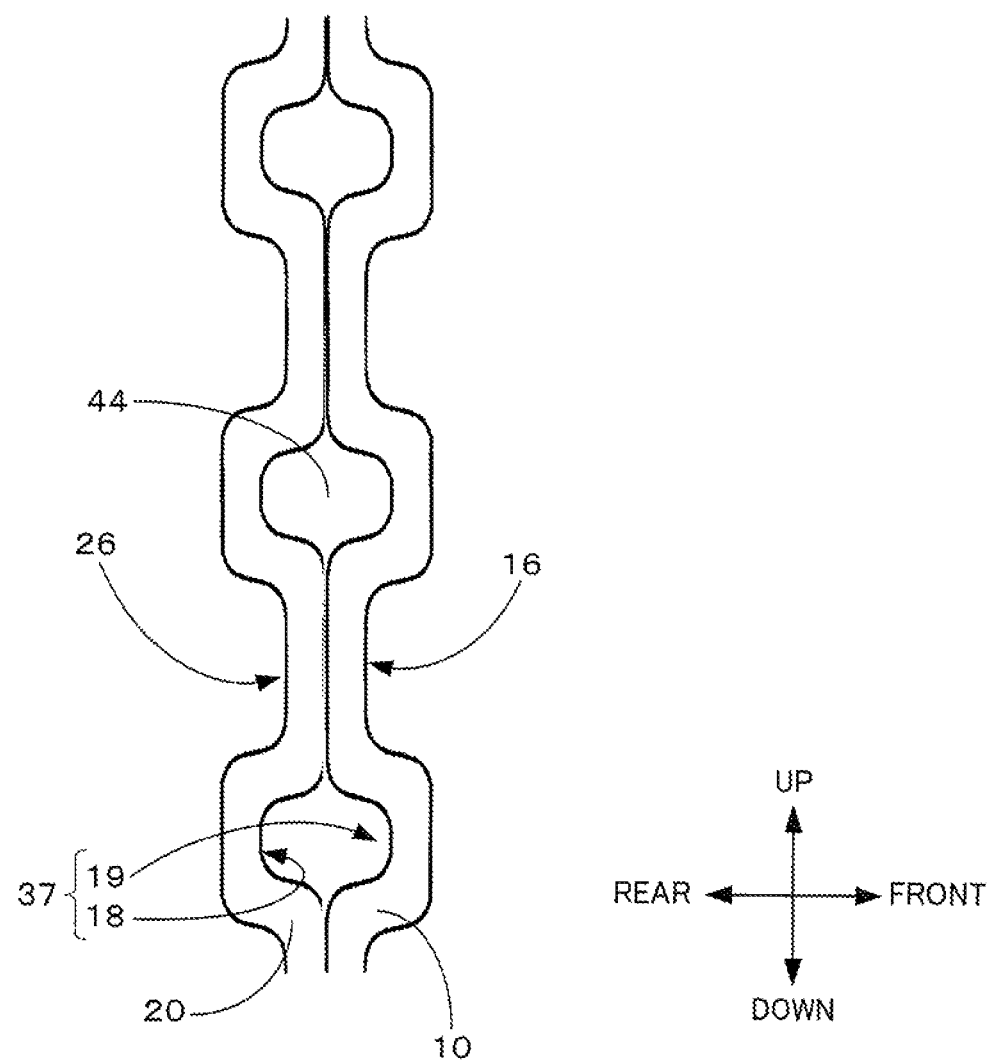
FIG. 5 shows an example of a shape of a cross-section A-A of FIG. 2A and FIG. 3B.

As shown in FIG. 2A, a first hole 30a and a second hole 30b are formed in the separator 6. Each of the first hole 30a and the second hole 30b is pierced on the surface 12 of the separator 6. For example, the first hole 30a is formed at a right edge of the separator 6. For example, the second hole 30b is formed at a left edge of the separator 6. As shown in FIG. 2A, a plurality of grooves are formed along the left-right direction on the surface 12 of the first plate 10. Each of the plurality of grooves is formed by a plurality of concavo-convex shapes. The plurality of concavo-convex shapes are formed, for example, by pressing. The plurality of concavo-convex shapes formed at the inner surface of the first plate 10, i.e., an opposite surface of the surface 12 (hereinafter referred to as a lamination surface 14), are shapes formed to mirror the convex shapes and the concave shapes of the surface 12 as a concave shapes and convex shapes in the lamination surface 14, respectively. The plurality of first gas flow path walls 16 are formed by a plurality of concave sections formed on the surface 12 of the first plate 10. More specifically, each of the plurality of first gas flow path walls 16 are formed by both side surfaces and bottom surfaces of each of the plurality the concave sections. The plurality of first gas flow path walls 16 are extending in the left-right direction from the first hole 30a to the second hole 30b. A top part of each of the plurality of first gas flow path walls 16 is contacted with the cathode electrode 64. An area forming the plurality of first gas flow path walls 16 is corresponding to a size of the outer shape of the MEA 4. That is, a space part surrounded by the cathode electrode 64 and the first gas flow path walls 16 is the first gas flow path 40. Air is exemplified as the gas flowing through the first gas flow path 40, the gas is not limited thereto. The gas flowing through the first gas flow path 40 may be gas including at least oxygen ($O_2$). A cross-sectional shape of the first gas flow path walls 16 is shown in FIG. 5. FIG. 5 shows a cross-section A-A of FIG. 2B. The plurality of first cooling medium flow path walls 18 are formed on the lamination surface 14 opposing to the surface 12, and the plurality of first cooling medium flow path walls 18 are formed at positions which are corresponding to positions of the plurality of first gas flow path walls 16 on the separator 6.

As shown in FIG. 2A, the first hole 30a is formed between a right side of the outer edge of the separator 6 and a right side of the edge of the plurality of first gas flow path walls 16. The second hole 30b is formed between a left side of the outer edge of the separator 6 and the a left side of the edge of the plurality of first gas flow path walls 16.

A flow of the gas in the first gas flow path 40 is as follows. For example, the first hole 30a is for supplying the oxidizing gas. For example, the second hole 30b is for discharging the oxidizing gas. In this case, the oxidizing gas is supplied from the first hole 30a to the first gas path flow 40, the oxidizing gas is flowed from the right side to the left side in FIG. 2 Along the first direction in the first gas path flow 40, and the oxidizing gas is discharged from the second hole 30b. As shown in FIG. 2A, a third hole 34a for supplying a cooling medium is formed at a downward left side of the separator 6. As shown in FIG. 2A, a fourth hole 34b for discharging a cooling medium is formed at a upper right side of the separator 6.

<Description of Second Gas Flow Path>

Figure 2B:
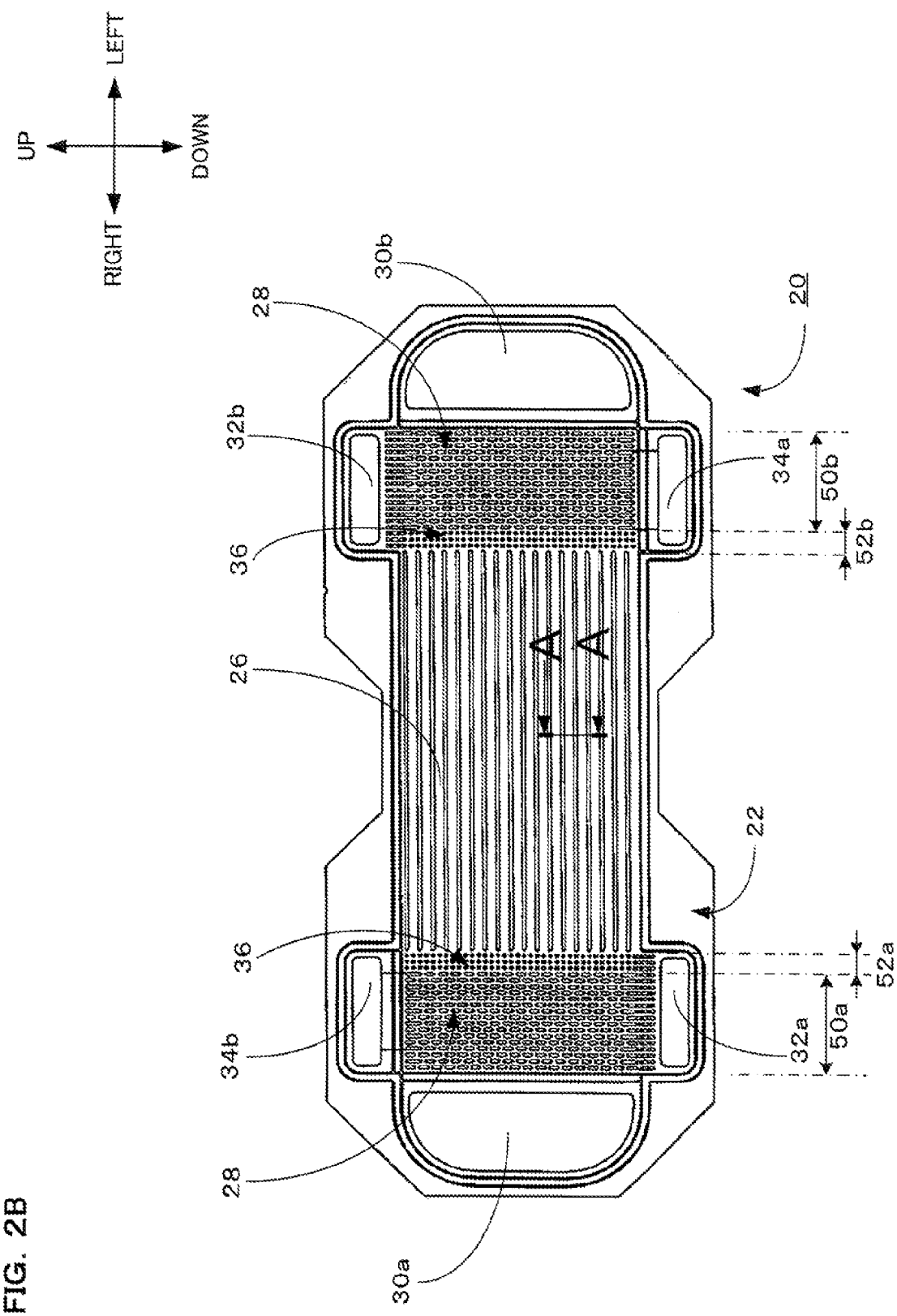
FIG. 2B shows an example of a side view showing a shape of a surface 22 of a second plate 20.

As shown in FIG. 2B, a plurality of grooves are formed at a central section of the surface 22 of the second plate 20 along the first direction. Each of the plurality of grooves is formed by a plurality of concavo-convex shapes. The plurality of concavo-convex shapes are formed, for example, by pressing. The plurality of concavo-convex shapes formed at the inner surface of the second plate 20, i.e., the opposite surface of the surface 22 (hereinafter referred to as the lamination surface 24), are shapes formed to mirror the convex shapes and the concave shapes of the surface 22 as concave shapes and convex shapes in the lamination surface 24, respectively. Each of the plurality of second gas flow path walls 26 is formed by each of a plurality of concave sections formed at the surface 22 of the second plate 20. More specifically, each of the plurality of second gas flow path walls 26 is formed by both side surfaces of each of the plurality of concave sections and bottom surface of each of the plurality of concave sections. The plurality of second gas flow path walls 26 are extending between a transition region 50a and a transition region 50b. Details of the transition region 50a and the transition region 5b will be described below. The plurality of second gas flow path walls 26 comprises the plurality of convex sections. A top of each of the plurality of convex sections contacts with the anode electrode 62. An area forming the plurality of second gas flow path walls 26 corresponds to a size of an outer shape of the MEA 4. That is, a space part surrounded by the anode electrode 62 and the each of the plurality of second gas flow path walls 26 is a linear flow path portion of the second gas flow path 42. While hydrogen may be exemplified as the gas flowing through the second gas flow path 42, the gas is not limited thereto. The gas flowing through the second gas flow path 42 may be gas including at least hydrogen ($H_2$). Further, a cross-sectional shape of one of the plurality of second gas flow path walls 26 is shown in FIG. 5. FIG. 5 is a view showing a cross-section A-A of FIG. 2B.

In FIG. 2B, a fifth hole 32a and sixth hole 32b are formed at both sides of the plurality of second gas flow path walls 26 in left-right direction. More specifically, in FIG. 2B, the fifth hole 32a is formed at a downward right end side of the plurality of second gas flow path walls 26. The sixth hole 32b is formed at an upper left end side of the plurality of second gas flow path walls 26. The fifth hole 32a and the sixth hole 32b are in communication with the second gas flow path 42. The transition region 50a is formed between the plurality of second gas flow path walls 26 and the first hole 30a, along the left-right direction and the transition region 50b is formed between the plurality of second gas flow path walls 26 and the second hole 30b along the left-right direction. In addition, a diffusion region 52a is formed between the plurality of second gas flow path walls 26 and the transition region 50a, and a diffusion region 52b is formed between the plurality of second gas flow path walls 26 and the transition region 50b. That is, in FIG. 2B, the diffusion region 52a and the diffusion region 52b are formed at both sides of the plurality of second gas flow path walls 26 in the left-right direction. The plurality of second gas flow path walls 26 are formed at a central section of the second plate 20. The transition region 50a and the transition region 50b are formed at both outer sides of the diffusion region 52a and the diffusion region 52b in the left-right direction. Further, in FIG. 2B, the fifth hole 32a is formed at a downward right side of the transition region 50a, and the sixth hole 32b is formed at an upper left side of the transition region 50b.

A positional relation of the plurality of second gas flow path walls 26, the transition region 50a and the transition region 50b, the diffusion region 52a and the diffusion region 52b and the fifth hole 32a and the sixth hole 32b according to the flow of the gas will be described in detail. In FIG. 2B, the fifth hole 32a is formed at the downward right side of the separator 6. The transition region 50a is formed in the vicinity of an upper side of the fifth hole 32a. The diffusion region 52a is formed at the left side of the transition region 50a. The plurality of second gas flow path walls 26 are formed at the left side of the diffusion region 52a. The diffusion region 52b is formed at the left side of the plurality of second gas flow path walls 26. The transition region 50b is formed at the left side of the diffusion region 52b. The sixth hole 32b is formed in the vicinity of the upper side of the transition region 50b.

A plurality of concave sections 28 are formed at rear sides of the transition region 50a and the transition region 50b, i.e., the lamination surface 24 of the second plate 20 corresponding to the transition region 50a and the transition region 50b. A plurality of second inner walls 39a is comprised by the plurality of concave sections 28 on the lamination surface 24 of the second plate 20. The plurality of concave sections 28 will be described below. Gas such as hydrogen or the like can flow in the up-down direction and the left-right direction along an outer periphery of each of the plurality of convex sections on the surface 22 of the second plate 20. Each of the plurality of concave sections corresponds to the plurality of concave sections 28. A length in the up-down direction of each of the plurality of convex sections corresponding to the plurality of concave sections 28 is greater than a length in the left-right direction of each of the plurality of convex sections. More specifically, each of the plurality of convex sections corresponding to the plurality of concave sections 28 comprises a planar shape having a length in the up-down direction greater than that in the left-right direction as shown in FIGS. 2(b) and 3(a). In the diffusion region 52a and the diffusion region 52b, a plurality of protrusions 36 are formed at the surface 22 of the second plate 20 as shown in FIGS. 2(b) and 3(a). A pre-determined number of protrusions 36 are formed at the surface 22 along the up-down direction. A pre-determined number of protrusions 36 are formed at the surface 22 along the left-right side direction. A gas (for example, hydrogen) can flow in the up-down direction and the left-right direction along an outer periphery of each of the plurality of protrusions 36. Further, a length in the up-down direction of each of the plurality of protrusions 36 is smaller than a length in the left-right direction of each of the plurality of convex sections corresponding to the plurality of concave sections 28. In the embodiment, a size of the each of the plurality of protrusions 36 in the up-down direction and a size of the each of the protrusions 36 in the left-right direction are substantially same, and each of the plurality of protrusions 36 in the up-down direction and the left-right direction has substantially circular planar shapes. However, the protrusions are not limited thereto but may have other arbitrary planar shapes.

An outer shape of the MEA 4 corresponds to an area including the plurality of second gas flow path walls 26, the diffusion region 52a and the diffusion region 52b, the transition region 50a and the transition region 50b. As described above, the second gas flow path 42 is formed by five space parts as follows: a first space part surrounded by the anode electrode 62 and the plurality of second gas flow path walls 26, a second space part surrounded by the anode electrode 62 and the transition region 50a, a third space part surrounded by the anode electrode 62 and the transition region 50b, a fourth space part surrounded by the anode electrode 62 and the diffusion region 52a, and a fifth space part surrounded by the anode electrode 62 and the diffusion region 52b.

Describing the flow of the gas in the second gas flow path 42 will be explained with reference to FIG. 2B. The fifth hole 32a is for supplying gas (for example, hydrogen). The sixth hole 32b is for discharging gas (for example, hydrogen). In this case, the gas flows from the fifth hole 32a of the downward right side in FIG. 2B in the up-down direction (from a downward side to an upper side in FIG. 2B). The gas flows through the transition region 50a from the downward side to the upper side in the up-down direction and the gas flows through the transition region 50a from the right side to the left side along the left-right direction in FIG. 2B. The gas spreads to each of the plurality of second gas flow path walls 26 due to the transition region 50a. Further, the gas flows more uniformly throughout the entire region of the diffusion region 52a due to the plurality of protrusions 36 formed at the diffusion region 52a. The gas flows from the diffusion region 52a to the right side of the plurality of second gas flow path walls 26. The gas flows through the second gas flow path wall 26 from the right side to the left side along the left-right direction, and flows into the diffusion region 52b. In the diffusion region 52b and the transition region 50b, the gas flows from the right side to the left side, the gas flows from the downward side to the upper side, and the gas is discharged from the sixth hole 32b.

As described above, The gas introduced from the fifth hole 32a is spread to each of the plurality of second gas flow path walls 26 at the transition region 50a. Further, the gas can flow uniformly to each of the plurality of second gas flow path walls 26 due to the plurality of protrusions 36 formed at the diffusion region 52a. Similarly, the gas discharged from the each of the plurality of second gas flow path walls 26 can be smoothly introduced into the sixth hole 32b due to the plurality of protrusions 36 and the transition region 50b formed at the diffusion region 52b.

In addition, since the plurality of protrusions 36 formed at the diffusion region 52a and the diffusion region 52b are provided on extension lines of the plurality of second gas flow path walls 26, the gas can be introduced into each of the plurality of second gas flow path walls 26 uniformly, and the gas discharged from each of the plurality of second gas flow path walls 26 can be introduced into the sixth hole 32b. In addition, a length of each of the plurality of protrusions 36 in the up-down direction is smaller than a length of each of the plurality of convex sections in the up-down direction. Each of the plurality of convex sections are formed at the transition region 50a and the transition region 50b.

<Description of Cooling Medium Flow Path>

Next, the cooling medium flow path 44 formed between the first plate 10 and the second plate 20 will be described with reference to FIGS. 3 to 5. In FIG. 3A and FIG. 3B, explanations which already have been described above will be omitted.

As shown in FIG. 3A, a plurality of first cooling medium flow path walls 18 are formed on the lamination surface 14. As shown in FIG. 3B, a plurality of second cooling medium flow path walls 19 are formed on the lamination surface 24. The plurality of first cooling medium flow path walls 18 are extending from the first hole 30a to the second hole 30b along the left-right direction. The plurality of second cooling medium flow path walls 19 are extending between the diffusion region 52a and the diffusion region 52b along the left-right direction as well as the plurality of second gas flow path walls 26 shown in FIG. 2B. The plurality of first cooling medium flow path walls 18 is formed by a plurality of grooves. The plurality of second cooling medium flow path walls 19 is also formed by a plurality of grooves. The plurality of grooves may be formed by continuous a plurality of concave sections. Each of the plurality of concave sections curves outward from inside of the separator 6 to outside of the separator 6. More specifically, each of the plurality of first cooling medium flow path walls 18 is formed by both side surfaces and bottom surfaces of each of the plurality the concave sections. Each of the plurality of second cooling medium flow path walls 19 is formed by both side surfaces and bottom surfaces of each of the plurality the concave sections. In the embodiment, the first plate 10 and the second plate 20 are laminated with facing each of bottom surfaces of the plurality of concave sections of the first cooling medium flow path walls 18 and each of bottom surfaces of the plurality of concave sections of the second cooling medium flow path walls 19 between the diffusion region 52a and the diffusion region 52b. As shown in FIG. 5, a plurality of first inner walls 37 is formed by facing each of bottom surfaces of the plurality of concave sections of the first cooling medium flow path walls 18 and each of bottom surfaces of the plurality of concave sections of the second cooling medium flow path walls 19 between the diffusion region 52a and the diffusion region 52b. Even though at least one of the bottom surfaces of the plurality of concave sections of the first cooling medium flow path walls 18 does not face with at least one of the bottom surfaces of the plurality of concave sections of the second cooling medium flow path walls 19 between the diffusion region 52a and the diffusion region 52b, the plurality of first inner walls 37 may be formed by either of the bottom surfaces of the plurality of concave sections of the first cooling medium flow path walls 18 or the bottom surfaces of the plurality of concave sections of the second cooling medium flow path walls 19. As described above, the plurality of first inner walls 37 are formed inside of the separator 6. Each of the plurality of first inner walls 37 extends between the diffusion region 52a and the diffusion region 52b along the left-right direction. A part of the cooling medium flow path 44 is formed by a space part surrounded by the plurality of first cooling medium flow path walls 18 and the plurality of second cooling medium flow path walls 19 between the diffusion region 52a and the diffusion region 52b. That is, the part of the cooling medium flow path 44 constitutes a plurality of first cooling medium flow paths provided inside of the separator 6 in the first direction between the first hole 30a and the second hole 30b for causing cooling medium supplied from the first hole 30a or the second hole 30b to flow in the first direction.

At the diffusion region 52a, a space part is formed between the bottom surfaces of the plurality of concave sections of the first cooling medium flow path walls 18 and the diffusion region 52a, and the space part enables the cooling medium to flow to the diffusion region 52a. At the diffusion region 52b, a space part is formed between the bottom surfaces of the plurality of concave sections of the first cooling medium flow path walls 18 and the diffusion region 52b, and the space part enables the cooling medium to flow to the diffusion region 52b.

Further, the plurality of concave sections 28 are formed at the transition region 50a and the transition region 50b. Each of the plurality of concave sections 28 curves outward from inside of the separator 6 to outside of the separator 6.
The plurality of concave sections 28 are formed along the up-down direction and the left-side direction at the transition region 50a and the transition region 50b. The details of the plurality of concave sections 28 will be described below. A second inner wall 39a is formed at the transition region 50b by facing the bottom surfaces of the plurality of concave sections corresponding to the plurality of first cooling medium flow path walls 18 and the plurality of concave sections 28. A third inner wall 39b is formed at the transition region 50a by facing the bottom surfaces of the plurality of concave sections corresponding to the plurality of first cooling medium flow path walls 18 and the plurality of concave sections 28. A space part surrounded by the second inner wall 39a is one part of the cooling medium flow path 44. That is, the space part constitutes a second cooling medium flow path provided inside of the separator 6 for communicating cooling medium between the plurality of first cooling medium flow paths and the third hole 34a. A space part surrounded by the third inner wall 39b is also one part of the cooling medium flow path 44. That is, the space part constitutes a third cooling medium flow path provided inside of the separator 6 for communicating cooling medium between the plurality of first cooling medium flow paths and the fourth hole 34b. Details of the second inner wall 39a and the third inner wall 39b will be described below. While water may be exemplified as the cooling medium flowing through the cooling medium flow path 44, the cooling medium is not limited thereto.

As shown in FIG. 3B, a third hole 34a for supplying the cooling medium is formed at a downward left side of the separator 6. A fourth hole 34b for discharging the cooling medium is formed at an upper right side of the separator 6. The third hole 34a is pierced on the surface 12 of the separator 6. The fourth hole 34b is pierced on the surface 12 of the separator 6. As shown in FIG. 3A and FIG. 3B, a fourth inner wall 38a is formed which connects the third hole 34a to the second inner wall 39a along the up-down direction. A space part surrounded by the fourth inner wall 38a and the first plate 10 constitutes a fourth cooling medium flow path provided inside of the separator 6 for communicating cooling medium between the third hole 34a and the second cooling medium flow path. As shown in FIG. 3A and FIG. 3B, a fifth inner wall 38b is formed which connects the fourth hole 34b to the third inner wall 39b along the up-down direction. A space part surrounded by the fifth inner wall 38b and the first plate 10 constitutes a fifth cooling medium flow path provided inside of the separator 6 for communicating cooling medium between the fourth hole 34b and the third cooling medium flow path. The cooling medium is supplied from the third hole 34a to the second inner wall 39a via the fourth inner wall 38a, and the cooling medium flows from the second inner wall 39a to the plurality of first inner walls 37. And then, the cooling medium flows from the plurality of first inner walls to the third inner walls 39b. Finally, the cooling medium flows from the third inner walls 39b to the fourth hole 34b via the fifth inner wall 38b.

Figure 4A:
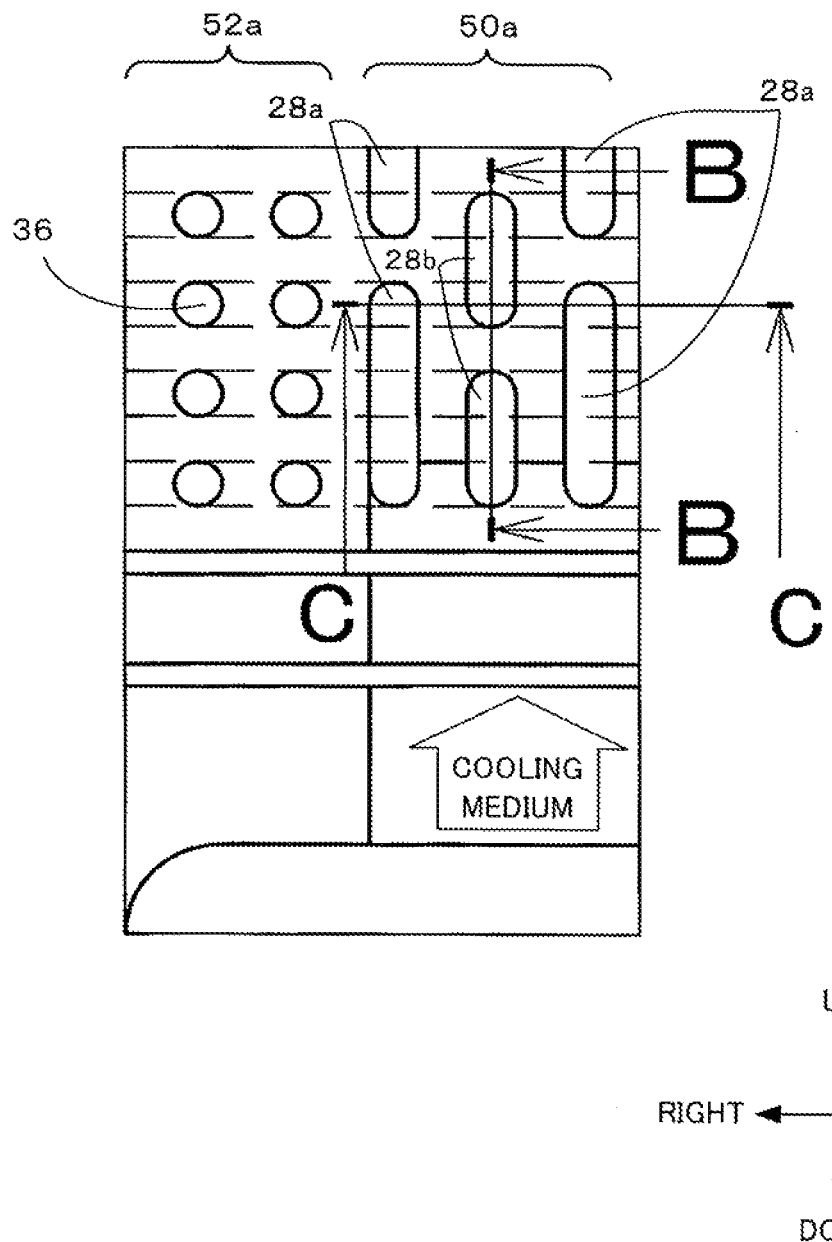
FIG. 4A shows an example of side view showing a detail of a transition region 50a and a diffusion region 52a of a separator 6.
Figure 4B:
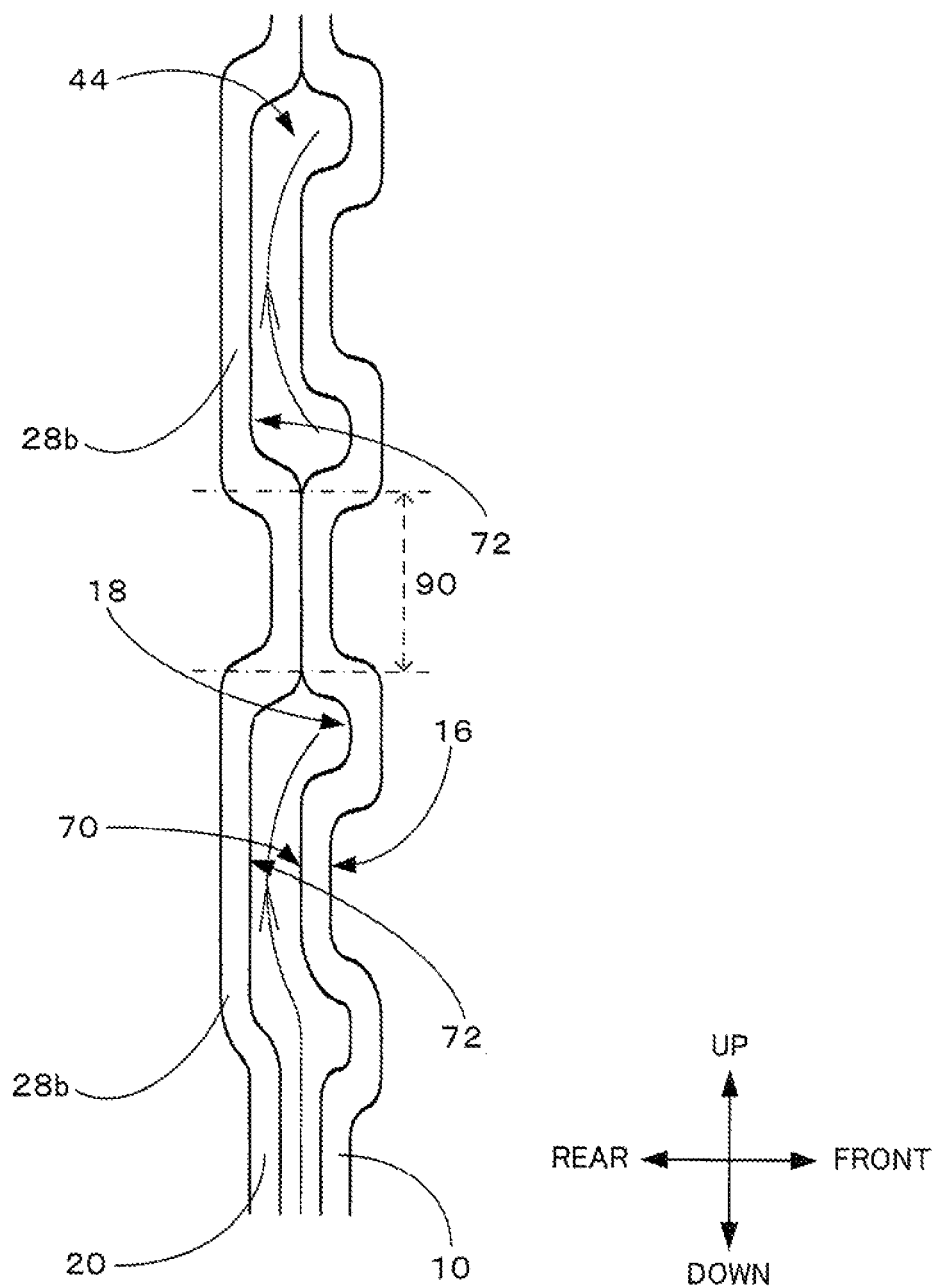
FIG. 4B shows an example of a shape of a cross-section B-B of FIG. 4A.

In the embodiment, as shown in FIG. 3(b), FIGS. 4(a) and 4(b), the second inner wall 39a and the third inner wall 39b are formed inside of the separator 6. Details of the second inner wall 39a and the third inner wall 39b will be described with reference to the second inner wall 39a, because a shape of the second inner wall 39a and a shape of the third inner wall 39b is the same shape.

As shown in FIG. 4 (a), a plurality of concave sections 28a and a plurality of concave sections 28b as the plurality of concave sections 28 are formed at the transition region 50a. More specifically, the plurality of concave sections 28a along the up-down direction and the plurality of concave sections 28b along the up-down direction are formed at the transition region 50a. The plurality of concave sections 28a and the plurality of concave sections 28b are alternatively formed along the left-right direction. Each of the plurality of concave sections 28a along the up-down direction extends along the up-down direction among three of the plurality of first cooling medium flow path walls 18. Each of the plurality of concave sections 28b along the up-down direction extends along the up-down direction among two of the plurality of first cooling medium flow path walls 18. Each of the plurality of concave sections 28a along the up-down direction may be extending along the up-down direction at least between one of the plurality of first cooling medium flow path walls 18 and other of the plurality of first cooling medium flow path walls 18. Each of the plurality of concave sections 28a along the up-down direction may be extending along the up-down direction at least between one of the plurality of first cooling medium flow path walls 18 and other of the plurality of first cooling medium flow path walls 18 which is next to the one of the plurality of first cooling medium flow path walls 18 along the up-down direction. Each of the plurality of concave sections 28b along the up-down direction may be extending along the up-down direction at least between one of the plurality of first cooling medium flow path walls 18 and other of the plurality of first cooling medium flow path walls 18. Each of the plurality of concave sections 28b along the up-down direction may be extending along the up-down direction at least between one of the plurality of first cooling medium flow path walls 18 and other of the plurality of first cooling medium flow path walls 18 which is next to the one of the plurality of first cooling medium flow path walls 18 along the up-down direction. A length of each of the plurality of concave sections 28a along the left-right direction is pre-determined length. A length of each of the plurality of concave sections 28b along the left-right direction is also pre-determined length.

As shown in FIG. 4(b), a top section 70 of the concave section in the lamination surface 14 and a bottom section 72 of the concave section 28 opposing to the top section 70 are separate from each other by a predetermined distance.

Figure 4C:
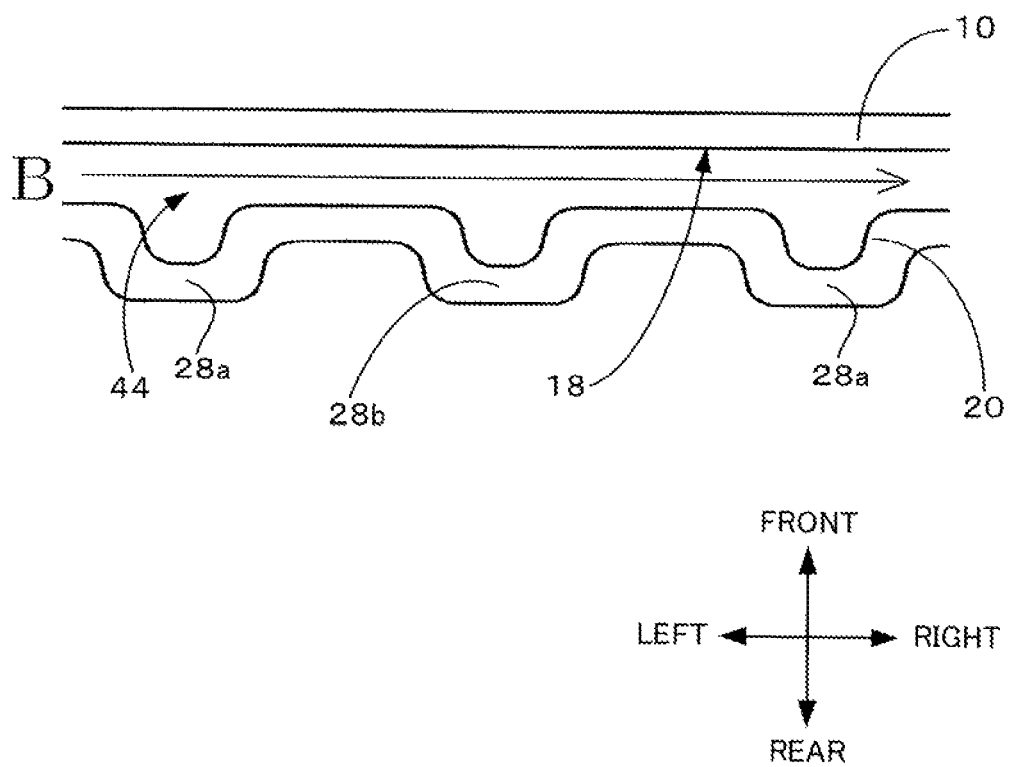
FIG. 4C shows an example of a shape of a cross-section C-C of FIG. 4A.

However, in an area indicated by an dotted arrow 90 along the up-down direction in FIG. 4(b), the cooling medium cannot flow in the up-down direction, because, at the transition region 50a, the plurality of convex sections which forms the plurality of first cooling medium flow path walls 18 contacts with lamination surface 24. As shown in FIG. 4(c), the cooling medium can flow in the left-right direction, even though the cooling medium cannot flow in the up-down direction as described above.

Figure 6:
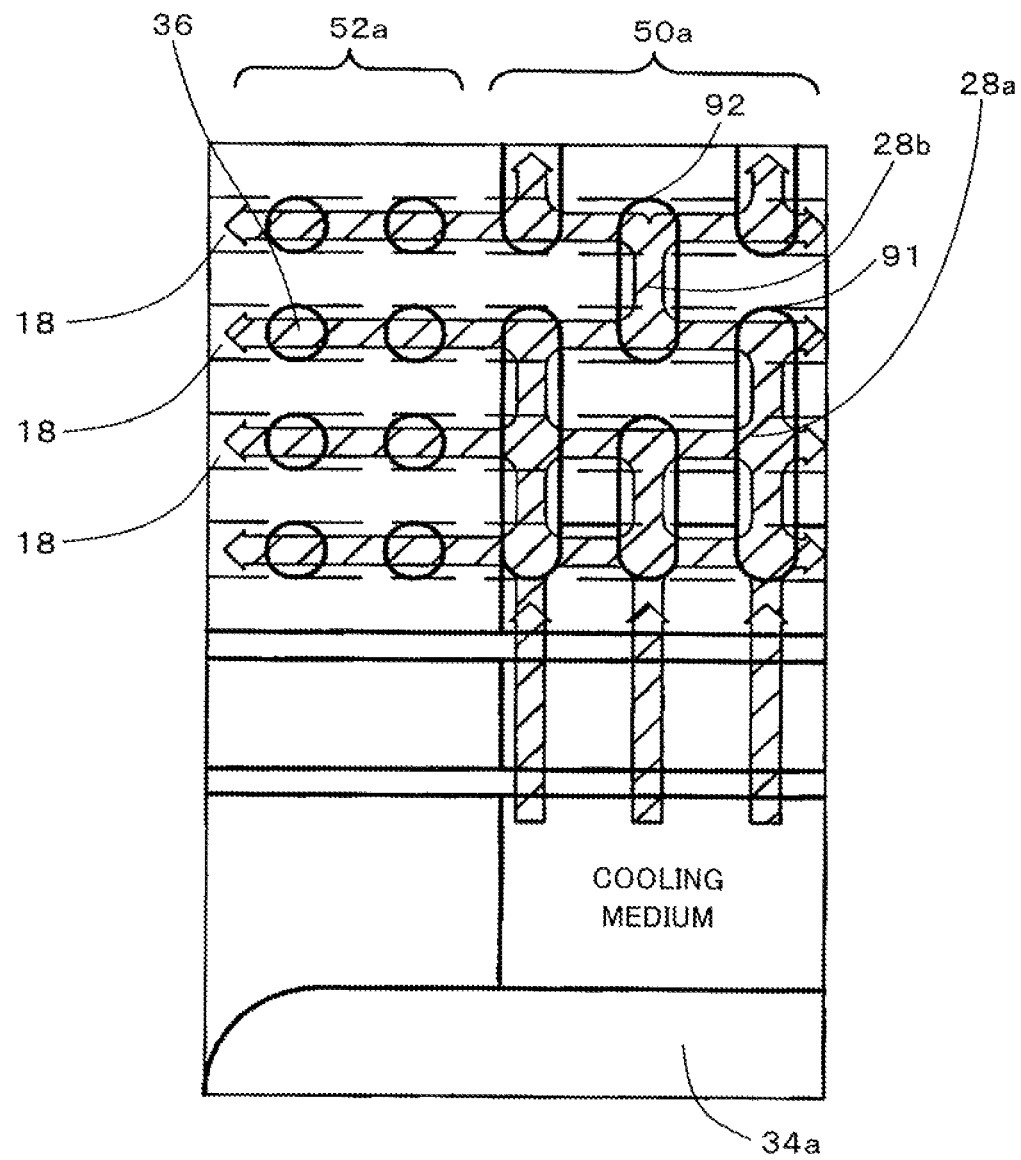
FIG. 6 shows an example of a side view schematically showing a flow of cooling medium in a diffusion region shown in FIG. 4.

In the cooling medium flow path 44 formed by the above-mentioned structure, a flow of the cooling medium supplied from the third hole 34a is shown by an arrow of FIG. 6. As shown in FIG. 6, the cooling medium supplied from the third hole 34a flows to the second inner wall 39a in the up-down direction. When the cooling medium reaches an area 91 in FIG. 6, the cooling medium cannot flow in the up-down direction. In that time, at the area 91, the cooling medium can flow in the left-right direction. The cooling medium can flow in the up-down direction along the second inner wall 39a again, after the cooling medium flows in the left-right direction. The cooling medium reaches an area 92 in FIG. 6 and the cooling medium cannot flow in the up-down direction again, after the cooling medium flows in the up-down direction. In that time, at the area 92, the cooling medium can flow in the left-right direction. As described above, the cooling medium can spread to whole inside of the separator 6 uniformly, because the cooling medium can flow inside of the separator 6 in the up-down direction and the left-right direction.

Similarly, in the fuel cell 2 including the separator shown in FIG. 1, any of the above-mentioned effects can be accomplished. Further, directions of the flow of the gas or the cooling medium are not limited to the above-mentioned directions but an inlet side and an outlet side of each direction may be reversed. Furthermore, the separator according to the present disclosure and the fuel cell including the same are not limited to the above-mentioned embodiments but may include various embodiments.

As this disclosure may be embodied in several forms without departing from the spirit of essential characteristics thereof, the present embodiment is therefore illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A fuel cell comprising:
   a membrane electrode assembly having planar shape; and
   a separator having planar shape and disposed on a surface of the membrane electrode assembly;
   wherein the separator comprises:
   a first plate,
   a second plate,
   wherein the first plate and the second plate each has concavo-convex shapes on one surface and shapes mirroring the concavo-convex shapes on the other surface,
   a plurality of first inner walls formed inside of the separator extending between a first hole and a second hole along a first direction, wherein the first hole is formed in one outer edge of the separator along the first direction, wherein the second hole is formed in other outer edge of the separator along the first direction;
   a second inner wall formed inside of the separator and disposed between the first hole and the plurality of first inner walls, the second inner wall connected to the plurality of first inner walls inside of the separator and a third hole, wherein the third hole is formed in one outer edge of the separator along a second direction perpendicular to the first direction;
   wherein the second inner wall comprises:
      a plurality of first grooves formed inside of the separator, each of the plurality of first grooves extending between the first hole and the plurality of first inner walls along the first direction; and
      a plurality of first concaves facing the plurality of first grooves inside of the separator, each of the plurality of first concaves curving outward from inside of the separator and extending along the second direction between one of the plurality of first grooves and other of the plurality of first grooves;
   a third inner wall formed inside of the separator and disposed between the second hole and the plurality of first inner walls, the second inner wall connected to the plurality of first inner walls and a fourth hole, wherein the fourth hole is formed in other outer edge of the separator along the second direction;
   wherein the third inner wall comprises:
      a plurality of second grooves formed inside of the separator, each of the plurality of second grooves extending between the second hole and the plurality of first inner walls along the first direction; and
      a plurality of second concaves facing the plurality of second grooves inside of the separator, each of the plurality of second concaves curving outward from inside of the separator and extending along the second direction between one of the plurality of second grooves and other of the plurality of second grooves,
   a plurality of gas flow path walls formed outside of the first plate by a plurality of concave sections formed on a surface of the first plate and is contacting the first and the second hole;
   a plurality of gas flow path walls formed outside of the second plate by a plurality of concave sections formed on a surface of the second plate.

2. The fuel cell according to claim 1,
   wherein the separator further comprising:
   a fourth inner wall formed inside of the separator and disposed between the third hole and the second inner wall; and
   a fifth inner wall formed inside of the separator and disposed between the fourth hole and the third inner wall.

3. The fuel cell according to claim 1,
   wherein each of the plurality of first concaves extending at least between one of the plurality of first grooves and other of the plurality of first grooves, the one of the plurality of first grooves and the other of the plurality of first grooves are next to each other; and
   wherein each of the plurality of second concaves extending at least between one of the plurality of second grooves and other of the plurality of second grooves, the one of the plurality of second grooves and the other of the plurality of second grooves are next to each other.

4. A separator having planar shape comprising:
   a first plate,
   a second plate,
   wherein the first plate and the second plate each has concavo-convex shapes on one surface and shapes mirroring the concavo-convex shapes on the other surface,
   a plurality of first inner walls formed inside of the separator extending between a first hole and a second hole along a first direction, wherein the first hole is formed in one outer edge of the separator along the first direction, wherein the second hole is formed in other outer edge of the separator along the first direction;
   a second inner wall formed inside of the separator and disposed between the first hole and the plurality of first inner walls, the second inner wall connected to the plurality of first inner walls inside of the separator and a third hole, wherein the third hole is formed in one outer edge of the separator along a second direction perpendicular to the first direction;
   wherein the second inner wall comprises:
      a plurality of first grooves formed inside of the separator, each of the plurality of first grooves extending between the first hole and the plurality of first inner walls along the first direction; and a plurality of first concaves facing the plurality of first grooves inside of the separator, each of the plurality of first concaves curving outward from inside of the separator and extending between one of the plurality of first grooves and other of the plurality of first grooves;

a third inner wall formed inside of the separator and disposed between the second hole and the plurality of first inner walls, the second inner wall connected to the plurality of first inner walls and a fourth hole, wherein the fourth hole is formed in other outer edge of the separator along the second direction;

wherein the third inner wall comprises:

a plurality of second grooves formed inside of the separator, each of the plurality of second grooves extending between the second hole and the plurality of first inner walls along the first direction; and a plurality of second concaves facing the plurality of second grooves inside of the separator, each of the plurality of second concaves curving outward from inside of the separator and extending between one of the plurality of second grooves and other of the plurality of second grooves, a plurality of gas flow path walls formed outside of the first plate by a plurality of concave sections formed on a surface of the first plate and is contacting the first and the second hole;

a plurality of gas flow path walls formed outside of the second plate by a plurality of concave sections formed on a surface of the second plate.

5. The separator according to claim 4, further comprising:

a fourth inner wall formed inside of the separator and disposed between the third hole and the second inner wall; and a fifth inner wall formed inside of the separator and disposed between the fourth hole and the third inner wall.

6. The separator according to claim 4, wherein each of the plurality of first concaves extending at least between one of the plurality of first grooves and other of the plurality of first grooves, the one of the plurality of first grooves and the other of the plurality of first grooves are next to each other; and wherein each of the plurality of second concaves extending at least between one of the plurality of second grooves and other of the plurality of second grooves, the one of the plurality of second grooves and the other of the plurality of second grooves are next to each other.

* * * * *